Patented June 16, 1925.

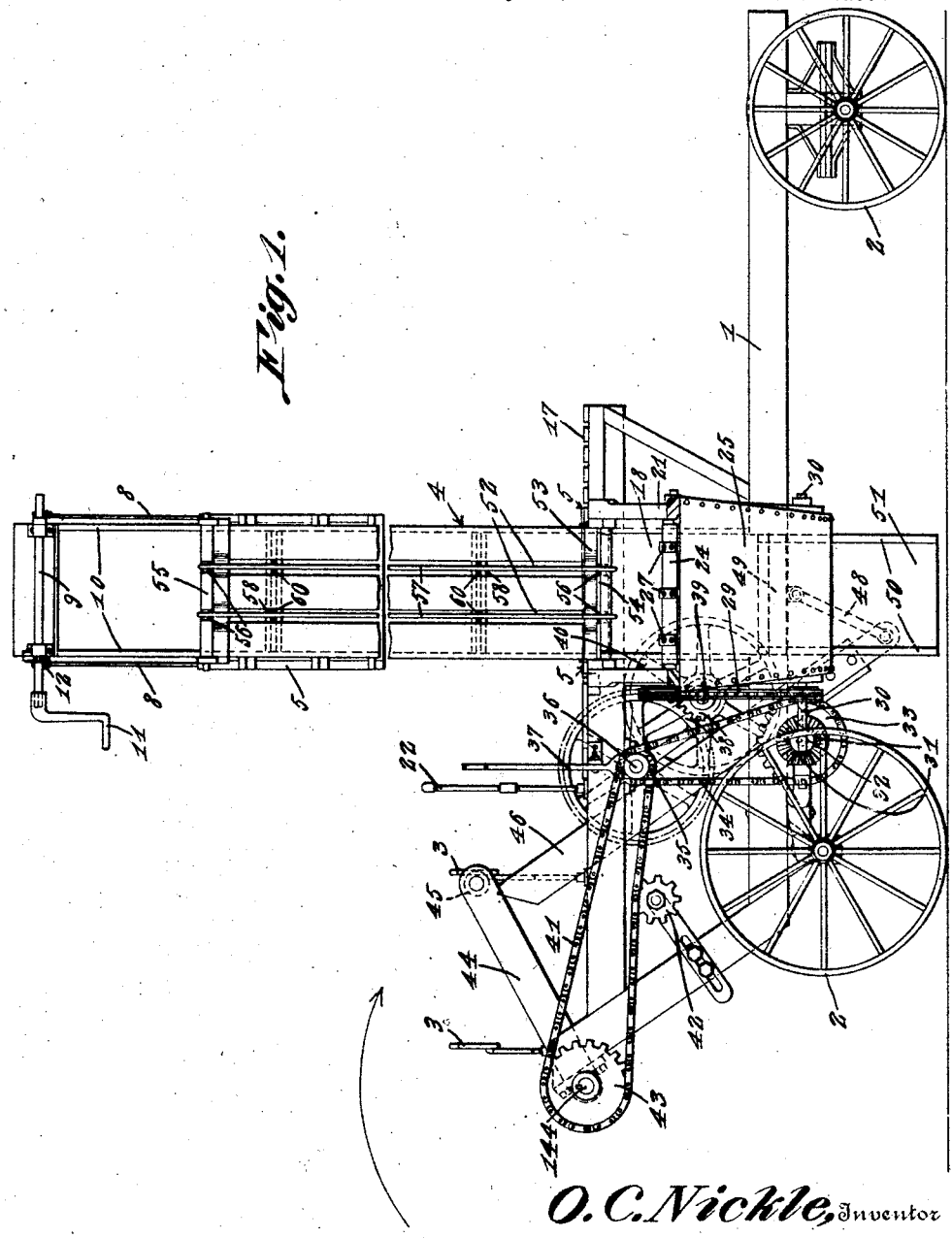

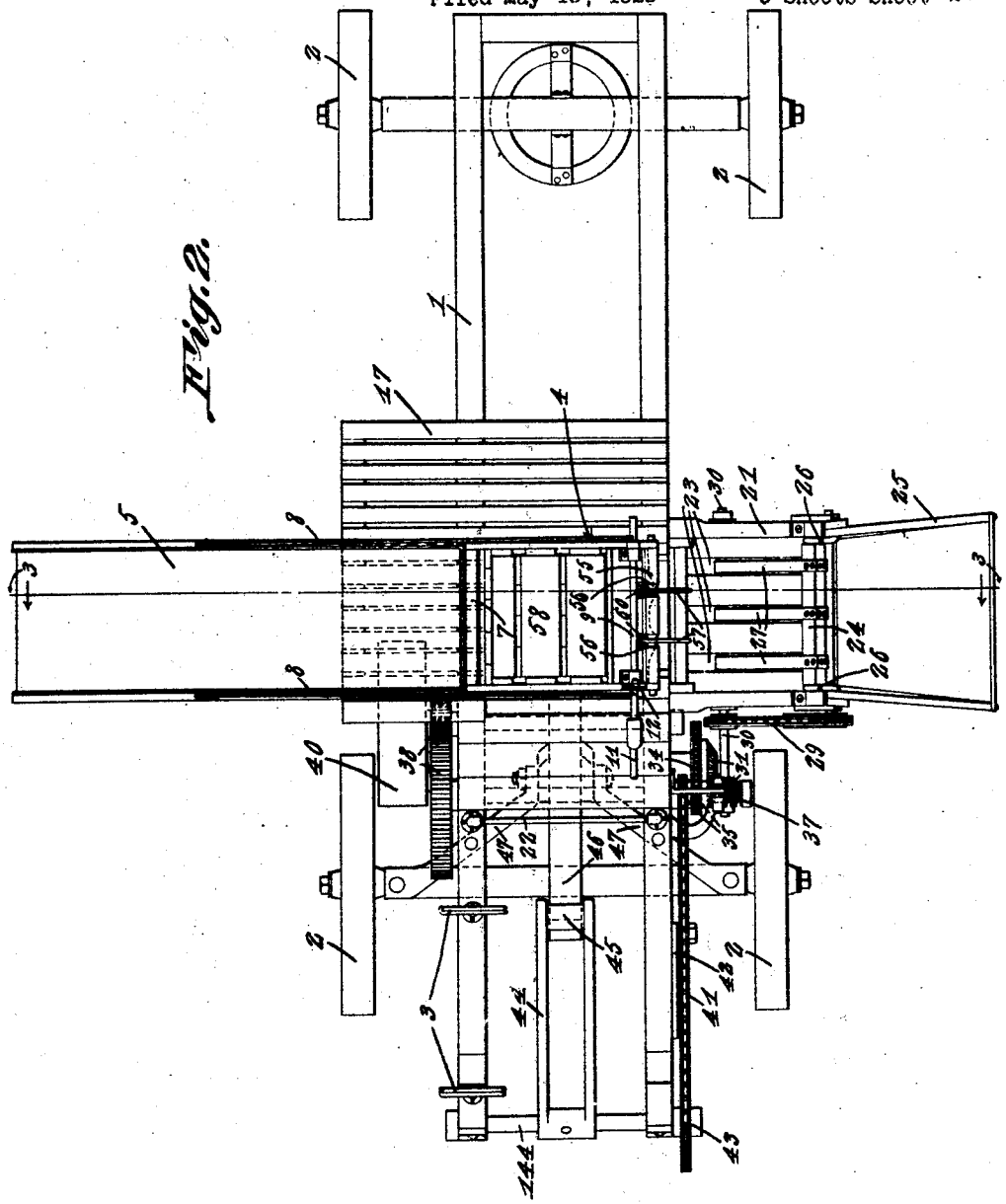

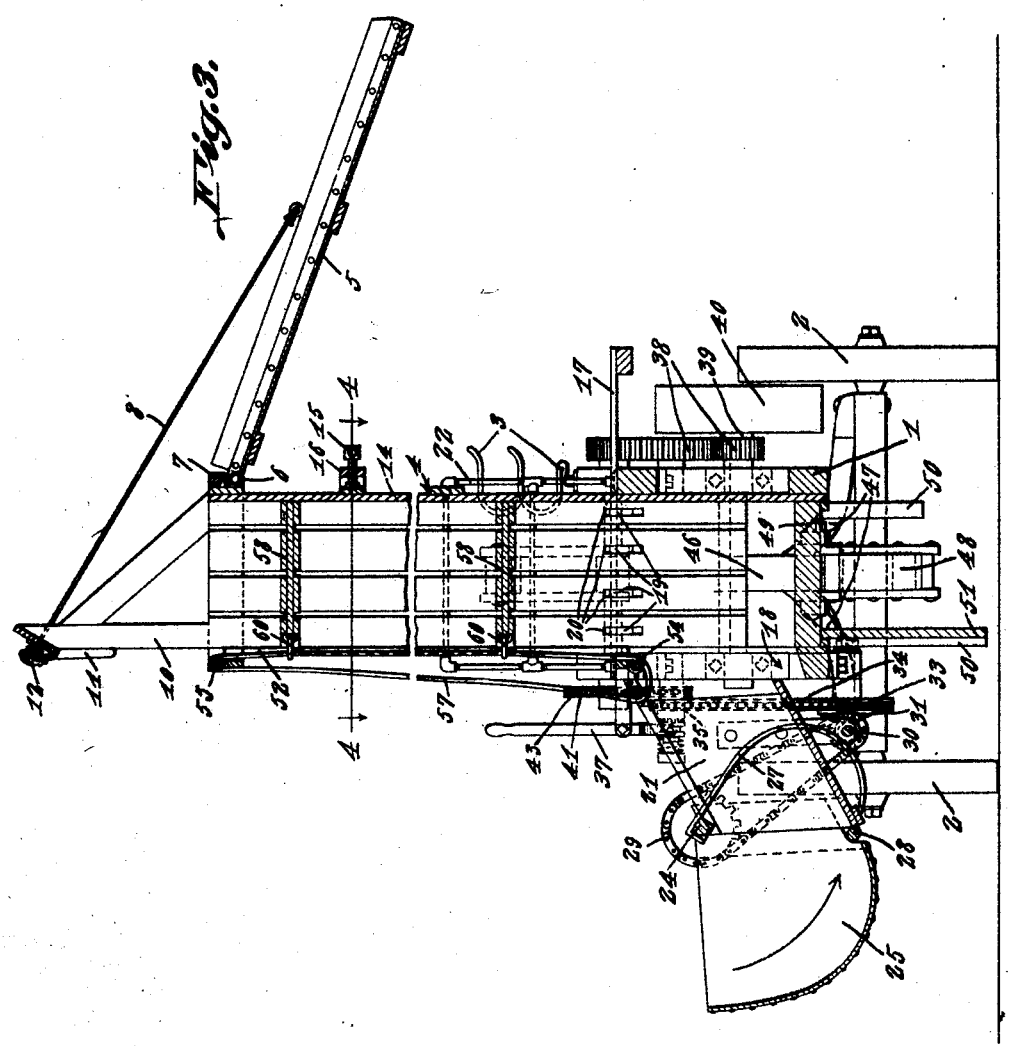

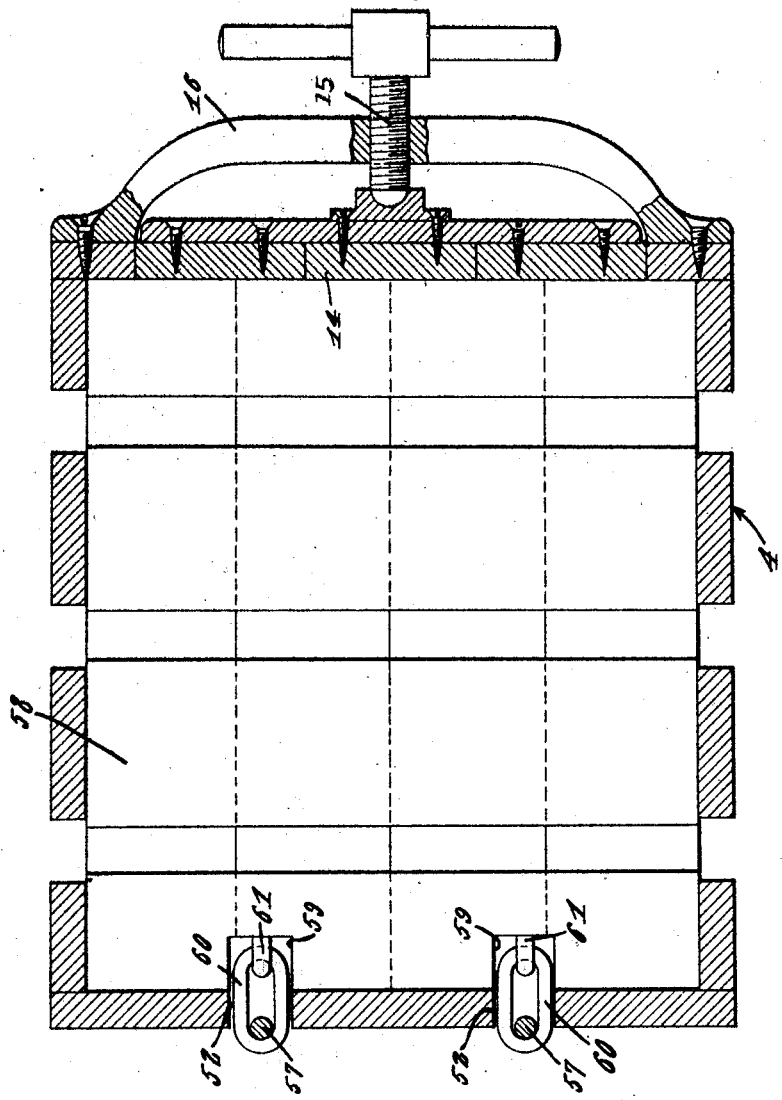

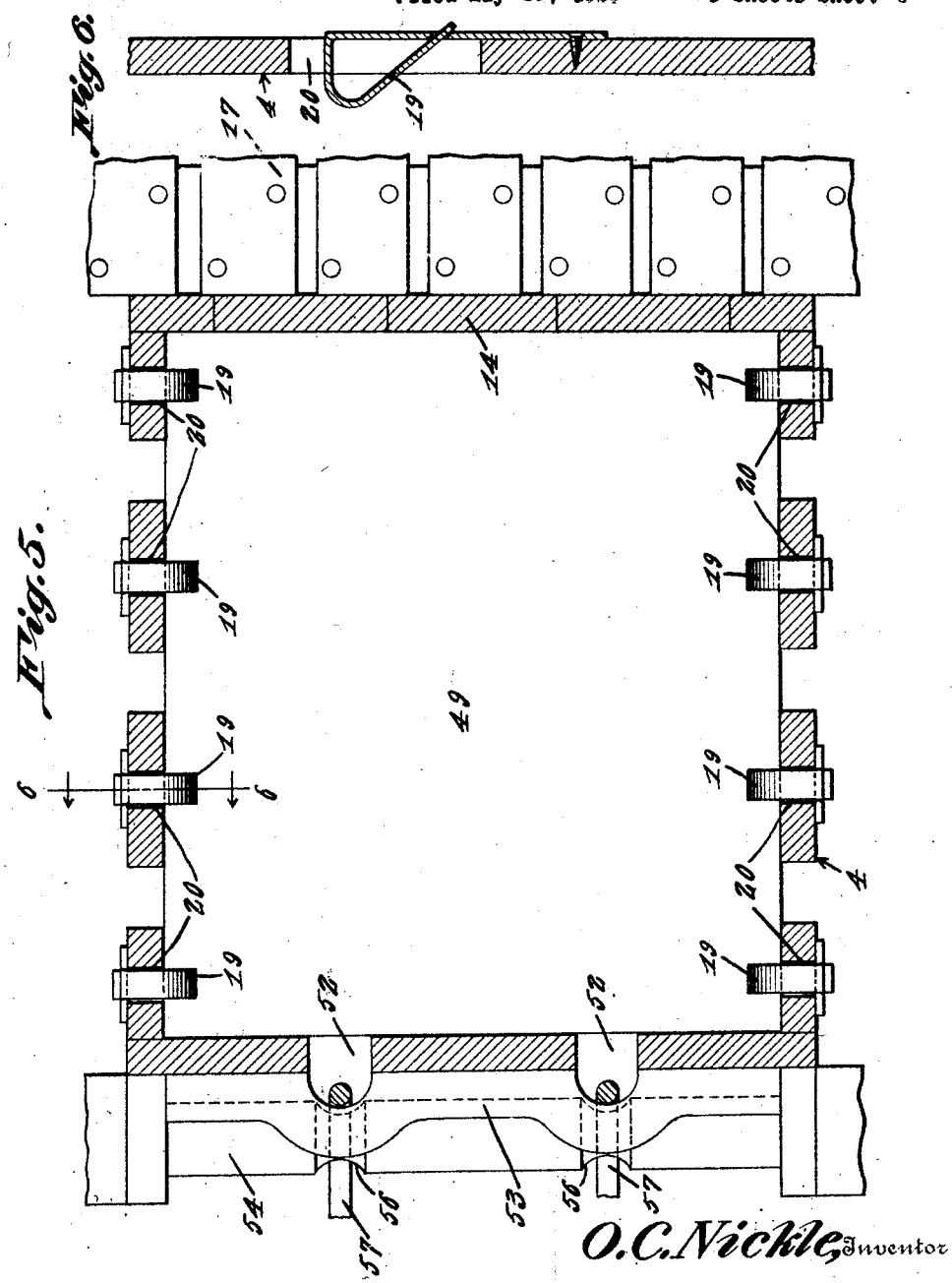

1,542,263

UNITED STATES PATENT OFFICE.

OREAN C. NICKLE, OF LAS ANIMAS, COLORADO.

HAY PRESS.

Application filed May 15, 1923. Serial No. 639,121.

*To all whom it may concern:*

Be it known that I, OREAN C. NICKLE, a citizen of the United States, residing at Las Animas, in the county of Bent and State of Colorado, have invented a new and useful Hay Press, of which the following is a specification.

The device forming the subject matter of this application is a hay press, and the invention aims to provide a device of the kind specified, embodying novel means for mounting the spacers which separate the finished bales, novel means being provided for feeding the hay into the bale truck, and novel means being provided for actuating the movable parts of the press.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a machine constructed in accordance with the invention; Figure 2 is a top plan; Figure 3 is a section on the line 3—3 of Figure 2; Figure 4 is a section on the line 4—4 of Figure 3; Figure 5 is a section on the line 5—5 of Figure 1; Figure 6 is a section on the line 6—6 of Figure 5.

The device forming the subject matter of this application includes a main frame 1 carried by ground wheels 2, the frame being provided with racks 3 for the bale wires. The frame 1 carries, intermediate its ends, an upstanding baling trunk 4. A laterally extended delivery chute 5 is hinged at 6 to the upper end of the trunk 4 for adjustment, there being a roller 7 at the upper end of the trunk 4, as shown in Figure 3, the roller 7 facilitating the passage of the completed bale from the trunk 4 onto the delivery chute 5. The angle which the delivery chute 5 defines with respect to the horizontal, may be regulated by means of flexible elements 8, connected at one end to the chute 5, intermediate the ends of the chute, the other ends of the flexible elements being engaged around a horizontal shaft 9 journaled on standards 10 carried by the upper end of the baling trunk 4, rotation being imparted to the shaft, through the instrumentality of a crank 11, or otherwise, retrograde rotation of the shaft being prevented by a pawl and ratchet mechanism 12. The trunk 4 has an adjustable or movable side 14, under the control of a screw 15 threaded into an arch 16 carried by the trunk 4. A platform 17 is mounted on the main frame 1 and extends part way about the trunk 4, the frame 1 carrying a hand rail 22 disposed at one end of the platform. Spring friction arms 19 are secured to the trunk 4 and extend within the trunk, through openings 20 in the trunk.

That side of the trunk 4 which is opposite to the movable or adjustable side 14 is provided in its lower end with an opening 18. An intake chute 21 is assembled with the lower end of the trunk 4 and is disposed about the opening 18, there being slots 23 in the bottom of the intake chute 21. A shaft 24 is journaled on the outer end of the intake chute 21. A hopper 25 cooperates with the chute 21 and is pivotally mounted at 26 on the shaft 24, so that the chute may be turned upwardly into an out-of-the-way position, when not in use. Curved spring feeding fingers 27 are mounted on the shaft 24 and operate through the slots 23 in the bottom of the intake chute 21. A roller 28 is journaled on the side portions of the chute 21 and lessens the friction imposed by the spring feeding fingers 24 as the feeding fingers ride into the slots 23.

A sprocket gearing 29 connects the shaft 24 with a lower shaft 30 journaled on the chute 21. Interengaged beveled pinions 31 connect the shaft 30 with a transverse shaft 32 journaled on the frame 1. There is a sprocket wheel 33 on the shaft 32, a sprocket chain 34 being engaged around the sprocket wheel 33 and being engaged with a double sprocket wheel 35 which is loose on a shaft 36 journaled on the frame 1 and extended transversely thereof, a clutch 37 being provided, whereby at the will of an operator, the sprocket wheel 35 may be connected to the shaft 36. Intermeshing gear wheels 38 connect the shaft 36 with a lower transverse drive shaft 39 journaled on the frame 1, and rotated through the instrumentality of a pulley 40 or otherwise About the double sprocket wheel 35 is engaged a chain 41, maintained in proper condition by a tightener 42 on the frame 1, the chain 41 being engaged about a sprocket wheel 43 on a shaft 144 journaled on the frame 1, the shaft 144 having an arm 44 provided with a roller 45 adapted to cooperate with the outer end of a walking beam 46, pivoted intermediate its ends on a fulcrum bracket 47 carried by the frame 1. The inner end of the walking beam 46 is pivoted to a link 48, which, in its turn is pivoted to a ram 49 mounted for vertical reciprocation in the baling trunk 4, the ram having depending guide fingers 50, slidable in the frame 1. The ram 49 carries a depending panel 51 coacting with the opening 18 in the lower side portion of the baling trunk 4.

That wall of the baling trunk 4 which is opposite to the adjustable side 14 is supplied with longitudinal openings 52. A bridge 53 is connected to said wall of the baling trunk 4, and to the chute 21 and extends across the openings 52. The roller 54 is journaled on the side portions of the chute 21 and is located beneath the bridge 53. A roller 55 is journaled on the upper end portion of the trunk 4, and is disposed parallel to the roller 54. The rollers 54 and 55 have circumferential grooves 56 about which are engaged loop-shaped guides 57, which may be flexible elements, the guides being alined with the openings 52 in the baling trunk, as shown in Figure 5. Spacers or heads 58 are disposed transversely of the baling trunk 4, inside the baling trunk, and are slidable in the baling trunk, longitudinally thereof. As disclosed in Figure 4, each spacer 58 has notches 59, wherein securing devices 60, such as links are secured as shown at 61, the securing devices being movable in the openings 52 of the baling trunk, the securing devices 60 being mounted to slide on the loop-shaped guides 57.

In practical operation, the shaft 39 is driven by the pulley 40 and from the shaft 39 rotation is imparted to the shaft 36 by way of the gear wheels 38. The shaft 36 drives the sprocket wheel 35, and motion is imparted to the shaft 144 by the chain 41 and the sprocket wheel 43. The arm 44, through the instrumentality of the roller 45, tilts the walking beam 46 on its fulcrum, and, by way of the link 48, vertical reciprocation is imparted to the ram 49 within the baling trunk 4. From the shaft 36, motion is transmitted by way of the sprocket wheel 35 and the chain 34 to the sprocket wheel 33, the wheel 33 rotating the shaft 32 and the beveled pinions 31 turning the lower shaft 30, the sprocket gearing 29 rotating the shaft 24. The hay is cast into the hopper 25, and the feeding fingers 27 on the shaft 24 advance the hay through the intake chute 21 and through the opening 18, into the bottom of the baling trunk 4, above the ram 49. The operation of the machine may be stopped at the will of an operator, when the clutch 37 is manipulated. The hay is forced upwardly in the baling trunk 4, by the ram 49, against the lowermost spacer 58, there being a predetermined quantity of hay in the baling trunk 4, between the spacers 58. When the uppermost spacer 58 arrives at the top of the baling trunk 4, the said spacer swings over to the left in Figure 3 and rides downwardly on the outer portions of the guides 57, the said spacer hanging in a vertical position, at the opening 18, on that portion of the guides 56 which is beneath the lower roller 54. As the hay is fed into the baling trunk 4, through the opening 18, by the action of the feeding fingers 27 on the shaft 44, the spacer enters the bottom of the trunk 4, through the opening 18, and rides upwardly on the inner portions of the guides 57, the said spacer then becoming the lowermost spacer of Figure 3. The completed bale arriving at the top of the baling trunk 4 is tilted to the right in Figure 3 and is slid over the roller 7 into the chute 5, from which the bale is discharged.

Especial attention is directed to the fact that the spacers 58 are automatic in their operation and require no attention on the part of the attendant.

What is claimed is:—

1. A baling press comprising a substantially vertical trunk, a loop-shaped guide extended longitudinally of the trunk, and spacers movable through the trunk and slidable on the guide, the spacers moving upwardly through the trunk responsive to the pressure of the material in the trunk, and moving downwardly on the guide externally of the trunk, the slidable mounting of the spacers on the guide permitting the spacers to move downwardly faster than they move upwardly, thus to minimize the number of spacers required.

2. In a baling press, a trunk, a ram operating in the trunk, a walking beam and a fulcrum therefor, the walking beam being connected to the ram, an intake chute discharging into the trunk adjacent to the lower end thereof, a rotary feeder operating in the chute, and means for driving the walking beam and the feeder from a single source of power.

In testimony that I claim the foregoing as my own, I have hereto affixed my signature in the presence of two witnesses.

OREAN C. NICKLE.

Witnesses:
Wm. J. Crompton,
D. F. McNeal.